(12) United States Patent
Kageyama et al.

(10) Patent No.: US 8,433,096 B2
(45) Date of Patent: Apr. 30, 2013

(54) OPERATION CONTROL MAP, DISPLAY UNIT, AND WHITE LINE DETECTION APPARATUS

(75) Inventors: Shioya Kageyama, Toyota (JP); Kentaro Mochida, Chiryu (JP); Takahito Nishii, Nagoya (JP); Takekazu Terui, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 415 days.

(21) Appl. No.: 12/865,824

(22) PCT Filed: Jan. 26, 2009

(86) PCT No.: PCT/IB2009/000125
§ 371 (c)(1),
(2), (4) Date: Aug. 2, 2010

(87) PCT Pub. No.: WO2009/095759
PCT Pub. Date: Aug. 6, 2009

(65) Prior Publication Data
US 2011/0001640 A1    Jan. 6, 2011

(30) Foreign Application Priority Data
Jan. 31, 2008  (JP) .................. 2008-020789

(51) Int. Cl.
*G06K 9/00* (2006.01)
*G06K 9/40* (2006.01)
*G06K 9/38* (2006.01)
*G03B 7/00* (2006.01)
*G08G 1/123* (2006.01)

(52) U.S. Cl.
USPC ........... 382/103; 382/266; 382/270; 382/274; 348/362; 348/148; 340/995.26; 340/995.19

(58) Field of Classification Search .................. None
See application file for complete search history.

(56) References Cited

U.S. PATENT DOCUMENTS
7,307,545 B2 * 12/2007 Nishida ................ 340/901
2003/0103649 A1 * 6/2003 Shimakage ............ 382/104
(Continued)

FOREIGN PATENT DOCUMENTS
EP   1 278 369 A2   1/2003
EP   1 278 369 A3   1/2003
(Continued)

*Primary Examiner* — Jennifer Mehmood
*Assistant Examiner* — Pameshanand Mahase
(74) *Attorney, Agent, or Firm* — Oblon, Spivak, McClelland, Maier & Neustadt, L.L.P.

(57) ABSTRACT

An operation control map of a white line detection apparatus, including a white line detection portion that detects a white line on a road based on a captured image of the road surface, that references the operation control map to determine whether to allow operation of the white line detection portion. The operation control map includes a region in which operation of the white line detection is allowed, and a region in which operation is not allowed, based on the gain of a road surface image signal and the temperature of a road surface imaging portion. The allowed region is set if the reduced accuracy of white line detection, due to the thermal noise generated in the solid-state imaging sensor, falls within an acceptable range, and the disallowed region is set if the reduced accuracy of white line detection falls outside of the acceptable range.

10 Claims, 11 Drawing Sheets

U.S. PATENT DOCUMENTS

| | | | |
|---|---|---|---|
| 2004/0027469 A1 | 2/2004 | Tsuruoka | |
| 2005/0169501 A1* | 8/2005 | Fujii et al. | 382/104 |
| 2010/0060738 A1 | 3/2010 | Kataoka et al. | |

FOREIGN PATENT DOCUMENTS

| | | |
|---|---|---|
| JP | 2-131084 | 5/1990 |
| JP | 2001-88609 | 4/2001 |
| JP | 2002-354463 | 12/2002 |
| JP | 2005-157670 | 6/2005 |
| JP | 2005-175961 | 6/2005 |
| JP | 2006-151301 | 6/2006 |
| JP | 2007-15457 | 1/2007 |
| JP | 2007-280144 | 10/2007 |

* cited by examiner

WHILE OPERATING
(DETETECTING WHITE LINE)

FIG. 3B

WHILE OPERATION
IS STOPPED

WHILE OPERATING
(DETETECTING WHITE LINE)

FIG. 9B

WHILE OPERATION
IS STOPPED
(DUE TO THERMAL NOISE)

FIG. 9C

WHILE OPERATION
IS STOPPED
(DUE TO OPERATION GUARANTEED
TEMPERATURE BEING EXCEEDED)

OPERATION CONTROL MAP, DISPLAY UNIT, AND WHITE LINE DETECTION APPARATUS

BACKGROUND OF THE INVENTION

1. Field of the Invention

The invention relates to an operation control map, a display unit, and a white line detection apparatus. More particularly, the invention relates to an operation control map, a display unit, and a white line detection apparatus that enable a white line detection portion to perform sufficiently within a range where the effect from thermal noise is acceptable.

2. Description of the Related Art

In recent years, white line detection apparatuses have been developed that detect white lines on roads based on captured images of the road surface. Some white line detection apparatuses according to related art include i) an imaging portion that includes a solid-state image sensor for capturing an image of the road surface, ii) a gain controlling portion that controls the gain when amplifying a road surface image signal generated by the imaging portion, based on the brightness around the vehicle, iii) a white line detection portion that compares the difference between the brightness values of the road and the white line in the amplified road surface image signal with a threshold value and detects the white line based on the result of the comparison, iv) a temperature measuring portion that measures the temperature of the imaging portion, v) a determining portion that determines whether to allow operation of the white line detection portion, and vi) an operation controlling portion that controls the operation of the white line detection portion based on the determination results of the determining portion.

The reason why the determining portion determines whether to allow operation of the white detection portion based on the temperature of the imaging portion is as follows. That is, thermal electrons are produced in a light receiving portion (i.e., a photodiode) of the solid-state image sensor. The quantity of thermal electrons gradually increases as the temperature of the imaging portion rises. Accordingly, if the temperature of the solid-state image sensor is high, a large quantity of thermal electrons accumulates in the light-receiving portion. If the voltage based on the thermal electrons is amplified by the amplifying portion, a large amount of thermal noise is produced. As a result, the white line detection portion becomes unable to distinguish the white line from the thermal noise so the identifying accuracy of the white line diminishes. Therefore, if the temperature of the image portion exceeds a predetermined temperature, the determining portion according to the related art will not allow the white line detection portion to operate at all.

Figure 11:
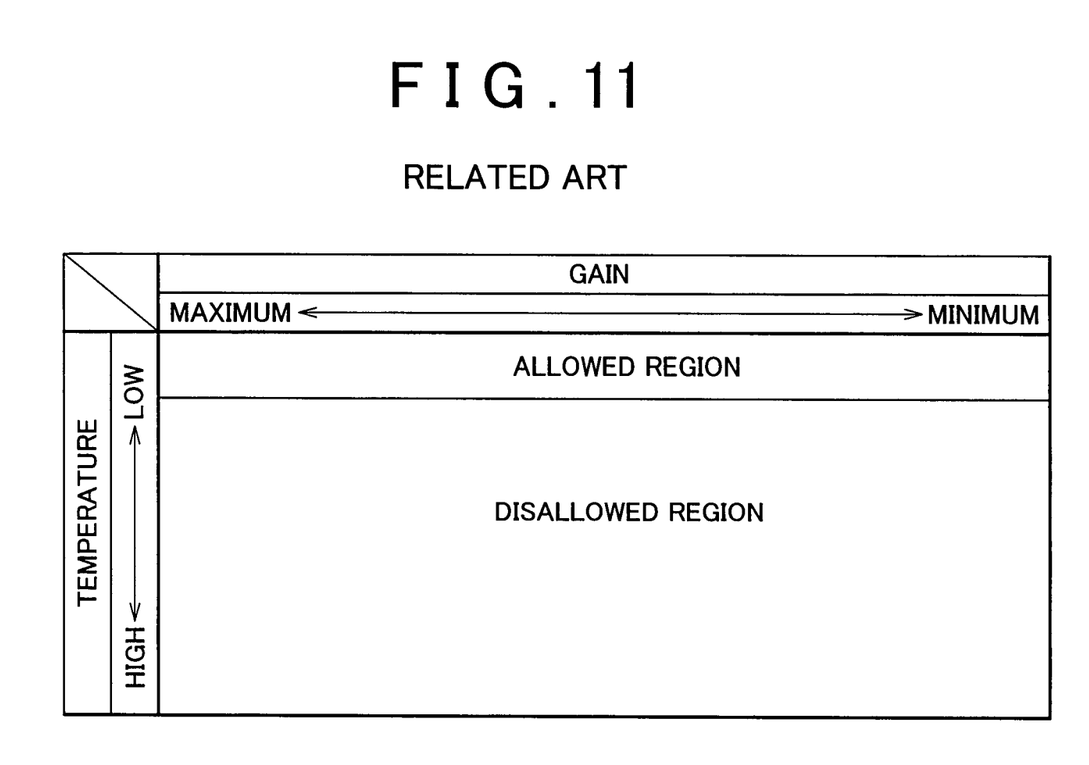
FIG. 11 is a view of an operation control map according to the related art.

In order to facilitate detection of the white line, the gain of the amplifying portion is controlled to gradually increase as the brightness around the vehicle decreases. Because thermal noise is amplified by the amplifying portion, the effect of the interference from thermal noise on the accuracy of the white line detection increases as the temperature of the image portion rises and the gain of the amplifying portion increases. FIG. 11 is a view of a white line detection portion control map provided in a determining portion of a white line detection apparatus according to related art. The white line detection portion control map uses the gain of the amplifying portion and the temperature of the imaging portion as variables, and includes an allowed region in which operation of the white line detection portion is allowed and a disallowed region in which operation of the white line detection portion is not allowed, based on the variables. The operation of the white line detection portion is controlled in accordance with the white line detection portion control map. In order to keep interference from thermal noise within an acceptable range, the white line detection portion control map according to the related art is set so that operation of the white line detection portion is not allowed at all if the temperature of the imaging portion becomes equal to or greater than a predetermined temperature, regardless of the gain of the amplifying portion, as shown in FIG. 11.

However, the temperature of the imaging portion increases during the daytime, when it is usually light outside and the gain of the amplifying portion is low. Therefore, it is difficult to imagine a case in which the temperature of the imaging portion and the gain of the amplifying portion are both high. Accordingly, during the daytime when the gain of the amplifying portion is low while the temperature is high, the white line detection apparatus according to the related art may stop operating without performing sufficiently even though performance-wise it is able to operate.

Also, Japanese Patent Application Publication No. 2005-175961 (JP-A-2005-175961) describes technology to prevent image quality from deteriorating when the temperature of an imaging device is high by limiting the range of image sensitivity (i.e., the gain when the image signal is amplified) if the temperature of the imaging device is high. However, limiting the gain in this way may make it more difficult to detect the white line when it is dark around the vehicle.

SUMMARY OF THE INVENTION

This invention thus provides an operation control map, a display unit, and a white line detection apparatus that enable a white line detection portion to perform sufficiently within a range where the effect of thermal noise is acceptable.

A first aspect of the invention relates to an operation control map which, in a white line detection apparatus provided with a road surface imaging portion, which includes a solid-state imaging sensor, a white line detection portion that detects white line on a road based on a captured image of the road surface, and a determining portion that determines whether to allow operation of the white line detection portion, is referenced as a determination reference for determining whether to allow operation of the white line recognition portion. The operation control map includes an allowed region in which operation of the white line detection is allowed and which is set based on the values of the gain of a road surface image signal generated by the road surface imaging portion and the temperature of the road surface imaging portion, which are variables in the operation control map; and a disallowed region in which the operation is not allowed and which is also set based on the values of the variables. The allowed region is a region that is set when the drop in accuracy of detecting white lines caused by thermal noise generated in the solid-state image sensor is within an acceptable range, and the disallowed region is a region that is set when the drop in accuracy of detecting white lines caused by the thermal noise is outside of the acceptable range.

According to this first aspect of the invention, the allowed region is set if the reduced accuracy of white line detection, due to the thermal noise generated in the solid-state imaging sensor, falls within an acceptable range, and the disallowed region is a region that is set if the reduced accuracy of white line detection falls outside of the acceptable range. Accordingly, an operation control map may be provided that enables a white line detection portion to perform sufficiently within a range in which interference from thermal noise is acceptable.

Also, a buffer region may be interposed between the allowed region and the disallowed region. Further, the buffer region may function like the disallowed region when coordinates determined by the gain and the temperature enter the buffer region from the disallowed region due to a change in the gain, and the buffer region may function like the allowed region when the coordinates enter the buffer region from the allowed region due to a change in the gain.

This structure makes it possible to prevent a phenomenon from occurring in which the white line detection portion frequently starts and stops repeatedly when the gain increases each time the vehicle passes through an area of darkness, such as when the vehicle passes through an area that is continuously shaded by trees, where there is a drastic different between light and dark, or keeps going into and coming out of tunnels.

A second aspect of the invention relates to a white line detection apparatus that recognizes a white line on a road. The white line detection apparatus includes i) a road surface imaging portion that includes a solid-state image sensor which captures an image of the road surface; ii) a gain controlling portion that controls the gain when amplifying a road surface image signal generated by the road surface imaging portion, based on the brightness around a vehicle; iii) a white line detection portion which compares the difference between brightness values of the road and a white line in the amplified road surface image signal with a threshold value, and detects the white line based on the comparison results; iv) a temperature measuring portion that measures the temperature of the road surface imaging portion; v) a determining portion that determines whether to allow operation of the white line detection portion based on the gain controlled by the gain controlling portion and the temperature measured by the temperature measuring portion; and vi) an operation controlling portion that controls the operation of the white line detection portion based on the determination results of the determining portion. The determining portion includes an operation control map in which the gain and the detected temperature are variables and which has an allowed region, in which operation of the white line detection portion is allowed, and a disallowed region, in which operation of the white line detection portion is not allowed, which are set based on the values of the variables, and determines whether to allow the operation based on the operation control map. The allowed region is a region that is set if the reduced accuracy of white line detection, due to the thermal noise generated in the solid-state imaging sensor, falls within an acceptable range, and the disallowed region is a region that is set if the reduced accuracy of white line detection falls outside of the acceptable range.

According to the second aspect of the invention, the allowed region is a region that is set when thermal noise generated by the solid-state image sensor causes the white line detection accuracy to drop within an acceptable range, and the disallowed region is a region that is set when the thermal noise causes the white line detection accuracy to drop to a level outside of the acceptable range. Accordingly, a white line detection apparatus may be provided that enables a white line detection portion to perform sufficiently within a range in which the effect from thermal noise is acceptable.

In the invention, a buffer region may be interposed between the allowed region and the disallowed region. The buffer region may function like the disallowed region when coordinates determined by the gain and the temperature enter the buffer region from the disallowed region due to a change in the gain. In addition, the buffer region may function like the allowed region when the coordinates enter the buffer region from the allowed region due to a change in the gain.

This structure makes it possible to prevent a phenomenon from occurring in which the white line detection portion frequently starts and stops repeatedly when the gain increases each time the vehicle passes through an area of darkness, such as when the vehicle passes through an area that is continuously shaded by trees, where there is a drastic different between light and dark, or keeps going into and coming out of tunnels.

Also, the white line detection apparatus may further include a display portion that informs a user of the operating state of the white line detection portion, and the display portion may indicate that the white line detection portion is i) operating or ii) not operating.

This structure makes it possible for a user to recognize whether the white line detection portion is operating.

Alternatively, the white line detection apparatus may further include a display portion that informs a user of the operating state of the white line detection portion. Also, the operation control map may further include a region where operation of the white line detection apparatus is disallowed when the detected temperature exceeds an operation guaranteed temperature of the white line detection apparatus, and the display portion may indicate that the white line detection portion is i) operating, ii) not operating due to thermal noise, or iii) not operating because the operation guaranteed temperature has been exceeded.

According to this structure, a case in which the white line detection portion stops operating due to thermal noise is treated just as non-recognizing state and is indicated by a different screen than the screen that appears when the white line detection portion stops operating due to the temperature of the imaging portion exceeding the operation guaranteed temperature so the user will not suspect that the white line detection apparatus is faulty.

A third aspect of the invention relates to a display unit which, in a white line detection apparatus provided with a road surface imaging portion, a white line detection portion that recognizes a white line on a road based on a captured image of the road surface, a determining portion that determines whether to allow operation of the white line detection portion based on the temperature of the road surface imaging portion and the gain when amplifying a road surface image signal generated by the road surface imaging portion, and an operation controlling portion that controls the operation of the white line detection portion based on the determination results of the determining portion, informs a user of the operating state of the white line detection portion. This display unit indicates that the white line detection portion is i) operating, ii) being controlled so as not to operate due to thermal noise generated in the road surface imaging portion, or iii) being controlled so as not to operate due to an operation guaranteed temperature of the white line detection apparatus being exceeded.

Also, if the white line detection portion is operating, the display unit may show the white line detected by the white line detection portion using a thick white line of a predetermined thickness on a screen, and if the white line detection portion is being controlled so as not to operate due to thermal noise generated in the road surface imaging portion, the display unit may show a white line that is thinner than the thick white line of predetermined thickness on the screen.

Further, if the white line detection portion is being controlled so as not to operate due to the operation guaranteed temperature of the white line detection apparatus being exceeded, the display unit may indicate that a lane keeping assist system is currently unavailable.

According to this third aspect of the invention, when operation of the white line detection portion stops due to thermal noise, it is treated just as non-recognizing state and is indicated by a screen different from the screen that appears when the white line detection portion stops operating due to the temperature of the imaging portion exceeding the operation guaranteed temperature. Accordingly, the user will not suspect that the white line detection apparatus is faulty.

The invention makes it possible to provide an operation control map, a display unit, and a white line detection apparatus that enable a white line detection portion to perform sufficiently within a range where the effect of thermal noise is acceptable.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
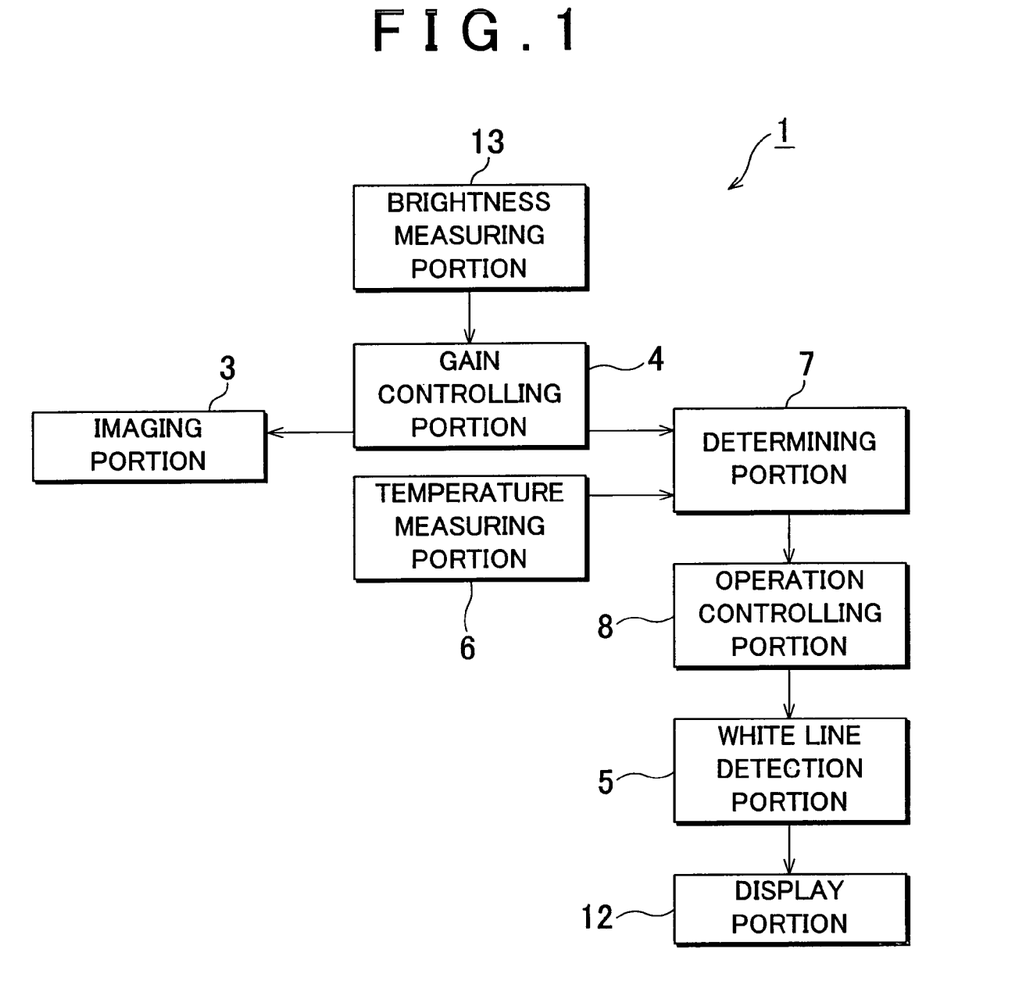
FIG. 1 is a block diagram of the structure of a white line detection apparatus according to a first example embodiment of the invention.
Figure 2:
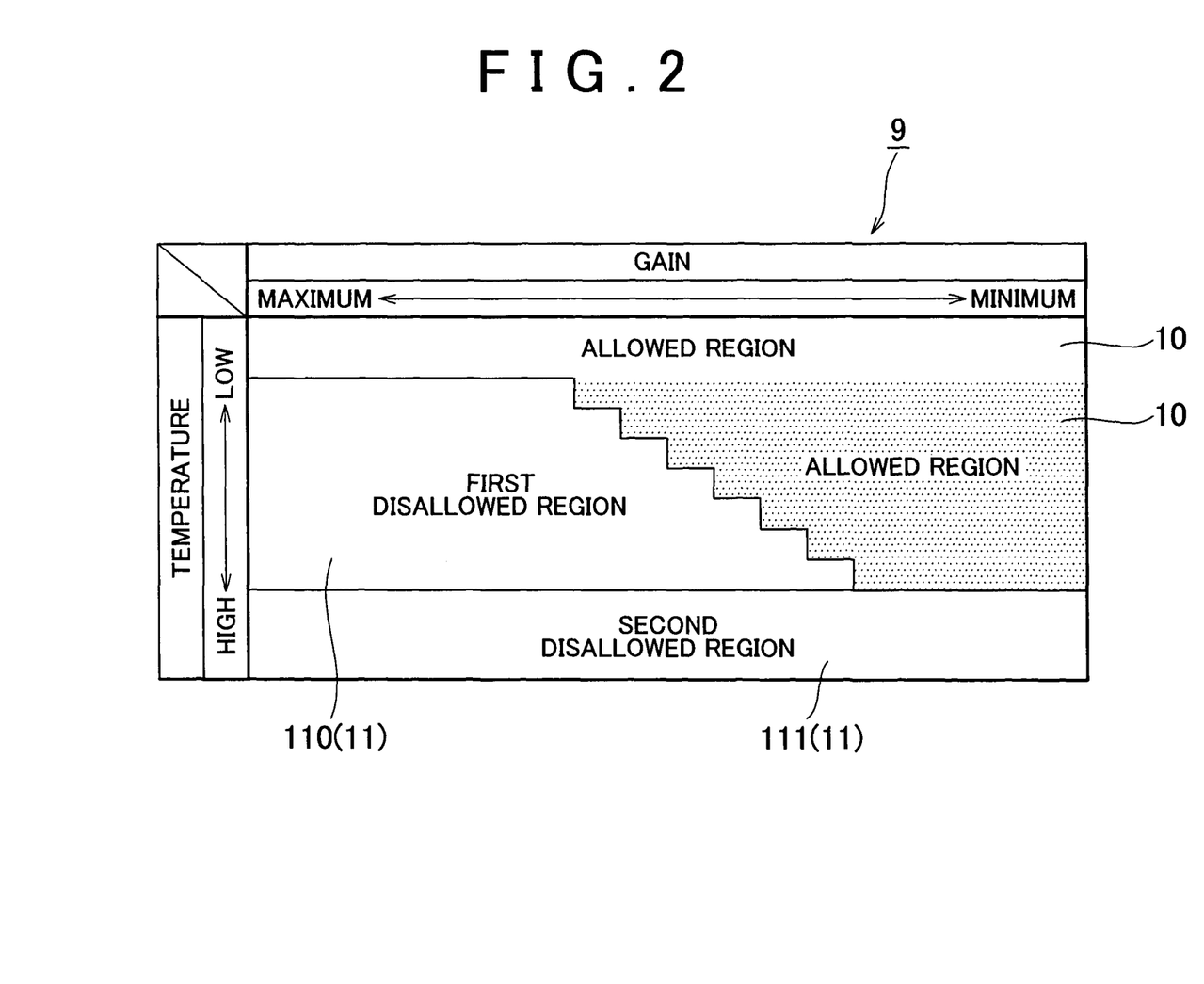
FIG. 2 is a view of an operation control map in the first example embodiment.
Figure 3A:
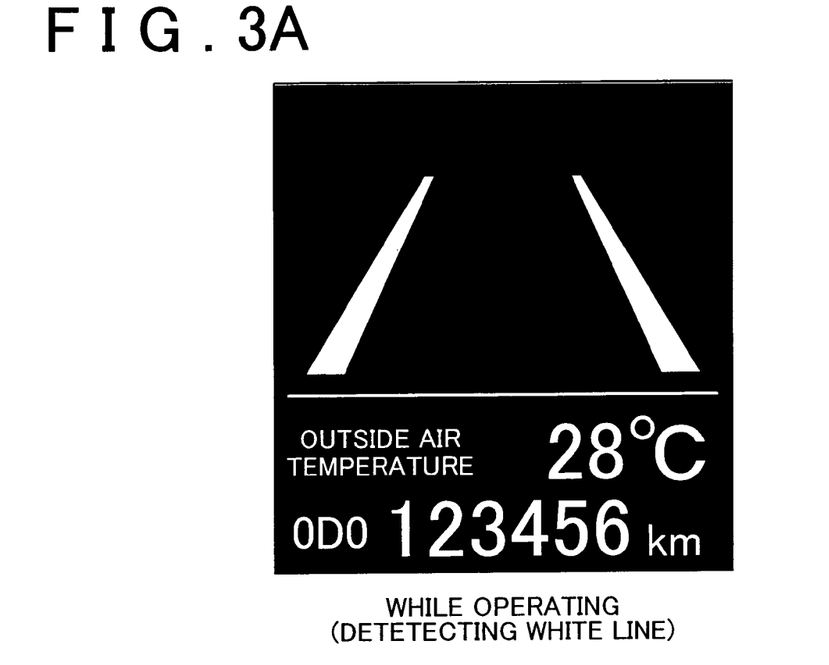
FIGS. 3A and 3B are views of screens on a display portion in the first example embodiment.
Figure 3B:
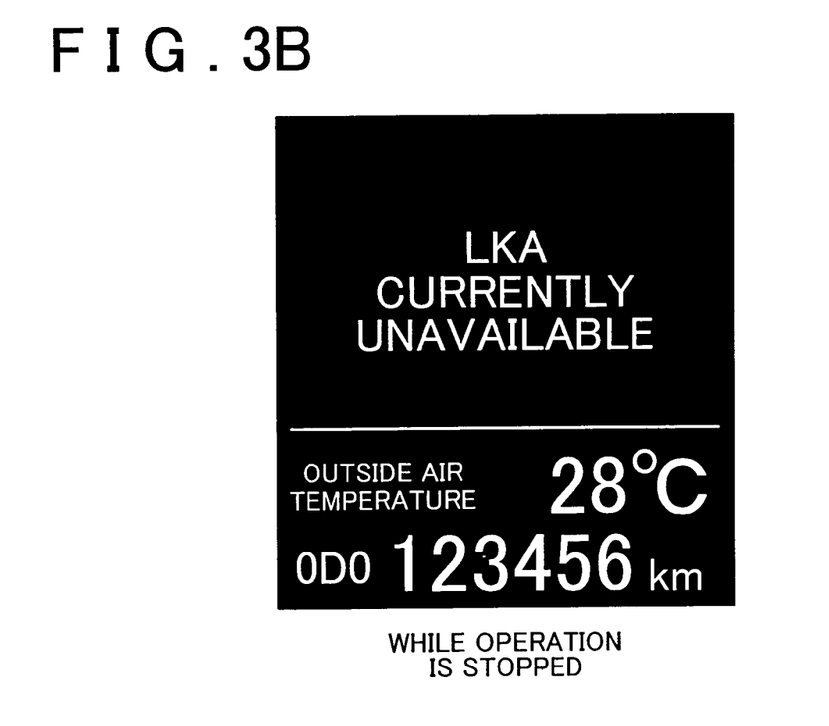
Figure 4:
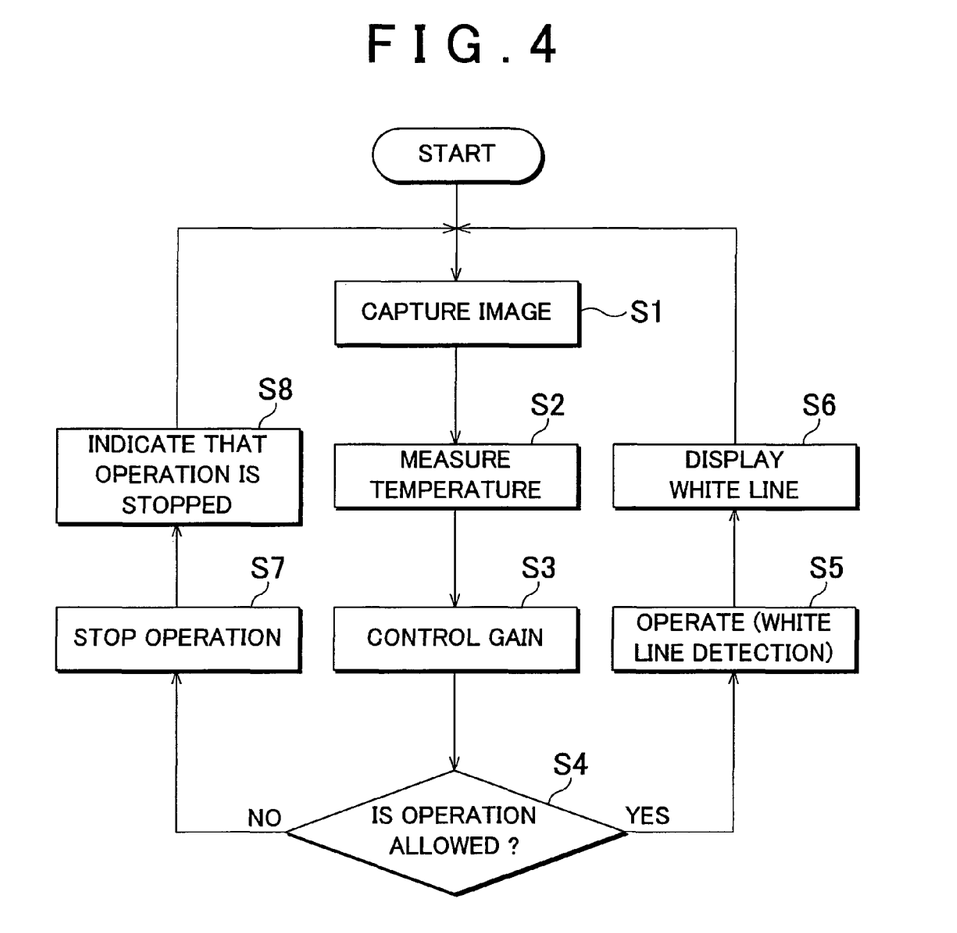
FIG. 4 is a flowchart illustrating operation of the white line detection apparatus according to the first example embodiment.

A white line detection apparatus according to a first aspect of the invention will now be described with reference to the accompanying drawings. FIG. 1 is a block diagram of the white line detection apparatus according to the first example embodiment. FIG. 2 is a view of an operation control map in the first example embodiment. FIGS. 3A and 3B are views of screens on a display portion in the first example embodiment, and FIG. 4 is a flowchart illustrating operation of the white line detection apparatus according to the first example embodiment.

The white line detection apparatus 1 according to the first example embodiment is a white line detection apparatus that detects white lines on a road. The white line detection apparatus 1 includes an imaging portion 3, a gain controlling portion 4, a white line detection portion 5, a temperature measuring portion 6, a determining portion 7, an operation controlling portion, a brightness measuring portion 13, and a display portion 12.

The imaging portion 3 includes a solid-state image sensor, not shown, that captures images of the road surface. A CCD image sensor and a CMOS image sensor are examples of sensors that may be used as the solid-state image sensor. The solid-state image sensor includes an amplifier, not shown. When a signal charge is output from a light receiving portion of the solid-state image sensor, the amplifier amplifies the signal voltage (i.e., a road surface image signal) based on that signal charge. The gain of the amplifier is controlled by the gain controlling portion 4.

The gain controlling portion 4 controls the gain when amplifying the road surface image signal generated by the imaging portion 3 based on the brightness around the vehicle. The brightness around the vehicle is measured by the brightness measuring portion 13. The brightness measuring portion 13 detects brightness by detecting the amount of light received by a light receiving element, for example. The gain controlling portion 4 controls the gain so that the gain of the road surface image signal increases as the amount of light received by the light receiving element decreases. Accordingly, the gain controlling portion 4 increases the gain of the road surface image signal when it is dark around the vehicle so that the white line may be detected more easily.

The white, line detection portion 5 compares the difference between the brightness values of the road and the white line in the amplified road surface image signal with a threshold value and detects the white line based on the comparison results. If the difference between the brightness values of the road and the white line in the amplified road surface image signal is greater than a predetermined threshold value, the white line detection portion 5 detects a white line. On the other hand, if the difference between the brightness values of the road and the white line in the amplified road surface image signal is equal to or less than the predetermined threshold value, the white line detection portion 5 does not detect a white line. The white line detection portion 5 compares the difference between the brightness values of the road and the white line in the amplified road surface image signal with the threshold value over an area within which there is assumed to be a white line. By determining whether there is a white line throughout an area where there is assumed to be a white line, the white line detection portion 5 is able to detect the entire white line in the road surface image.

The temperature measuring portion 6 measures the temperature of the imaging portion 3. The temperature information of the imaging portion 3 is output to the determining portion 7.

The determining portion 7 determines whether to allow operation of the white line detection portion 5 based on the gain controlled by the gain controlling portion 4 and the temperature measured by the temperature measuring portion 6.

The determining portion 7 includes a CPU, RAM, and ROM. An operation control map 9 (see FIG. 2) is stored in the ROM. The operation control map 9 uses the gain controlled by the gain controlling portion 4 and the temperature measured by the temperature measuring portion 6 as variables. The operation control map 9 has an allowed region 10, in which operation of the white line detection portion 5 is allowed, and a disallowed region 11, in which operation of the white line detection portion 5 is not allowed. The two regions 10 and 11 are set based on the values of the variables. In the allowed region 10, the shaded trapezoidal portion in FIG. 2 is the portion of the allowed region that has been increased from the allowed region according to the related art (see FIG. 11). The determining portion 7 determines whether to allow operation of the white line detection portion 5 based on the operation control map 9. When coordinates on the operation control map 9, which are determined by the gain and the temperature, fall within the allowed region 10, the determining portion 7 makes a determination to allow operation of the white line detection portion 5. On the other hand, when the coordinates on the operation control map 9, which are determined by the gain and the temperature, are within the disallowed region 11, the determining portion 7 makes a determination to prohibit operation of the white line detection portion 5.

The allowed region 10 is set if the reduction in accuracy of white line detection accuracy due to thermal noise generated in the solid-state imaging sensor is within an acceptable range. The disallowed region 11 includes a first disallowed sub-region 110 and a second disallowed sub-region 111. The first disallowed sub-region 110 is a region that is set if the excessive thermal noise causes the white line detection accuracy to fall below an acceptable range. The second disallowed sub-region 111 is a region that is set if the temperature of the imaging portion 3 exceeds a temperature at which operation of the imaging portion 3 is guaranteed (hereinafter this temperature will be referred to as "operation guaranteed temperature".)

The operation controlling portion 8 controls the operation of the white line detection portion 5 based on the determination results of the determining portion 7. If the determining portion 7 determines that operation is allowed, the operation controlling portion 8 operates the white line detection portion 5. If the determining portion 7 determines that operation is not allowed, the operation controlling portion 8 prohibits (i.e., stops) operation of the white line detection portion 5. The phrase "prohibits (i.e., stops) operation of the white line detection portion 5" includes stopping just the function at the output stage of the white line detection portion 5 as well as stopping all of the functions of the white line detection portion 5.

The display portion 12 informs the user of the operating state of the white line detection portion 5. The display portion 12 indicates whether the white line detection portion 5 is in a state in which it is able to detect a white line (hereinafter this state will be referred to as a "recognizing state") or in a state in which it is unable to detect a white line (hereinafter this state will be referred to as a "non-detection state") based on the determination results from the determining portion 7. That is, when the determination portion 7 determines that operation is allowed based on the fact that the coordinates on the operation control map 9 which are determined by the gain and the temperature are in the allowed region 10 such that the white line detection portion 5 is in the recognizing state, the display portion 12 displays the white line detected by the white line detection portion 5 (see FIG. 3A). On the other hand, when the determination portion 7 determines that operation is prohibited because the coordinates on the operation control map 9 which are determined by the gain and the temperature are in either the first disallowed region 110 or the second disallowed region 111 such that the white line detection portion 5 is in the non-detection state, the display portion 12 indicates that the white line detection portion 5 is in the non-detection state (see FIG. 3B).

FIG. 3A is a view of an example of a screen displayed by the display portion 12 when the white line detection portion 5 is in the recognizing state. In the example shown in FIG. 3A, two white lines detected by the white line detection portion 5 appear on the screen. Furthermore, the outside air temperature and the total distance travelled may be displayed at the bottom of the screen. The screen indicates that the white line detection portion 5 is operating normally.

FIG. 3B is a view of an example of a screen displayed by the display portion 12 when the white line detection portion 5 is in the non-detection state as a result of excessive thermal noise or the temperature of the imaging portion 3 exceeding the operation guaranteed temperature. In the example shown in FIG. 3B, the phrase "LKA CURRENTLY UNAVAILABLE" appears in the center of the screen. This phrase indicates that the white line detection portion 5 is unable to recognize a white line due to excessive thermal noise or because the temperature of the imaging portion 3 exceeds the operation guaranteed temperature. In addition, the outside air temperature and the total distance travelled may be displayed at the bottom of the screen.

Next, the operation of the white line detection apparatus 1 according to the first example embodiment will be described with reference to FIG. 4, which is a flowchart illustrating an example of the operation of the white line detection apparatus 1. First, the imaging portion 3 captures an image of the road surface ahead of the vehicle (step S1). Next, the temperature measuring portion 6 measures the temperature of the imaging portion 3 (step S2). Then the gain controlling portion 4 controls the gain of the amplifying portion based on the brightness around the vehicle (step S3). Next, the determining portion 7 determines whether it is alright to operate the white line portion 5 based on whether the coordinates on the operation control map 9 that are determined by the gain and the temperature are in the allowed region 10, the first disallowed region 110, or the second disallowed region 111 (step S4).

If the coordinates are currently in the allowed portion 10, the determining portion 7 makes a determination to allow operation of the white line detection portion 5 and the process proceeds on to step S5. In step S5, the white line detection portion 5 detects the white line based on the captured image signal. Then the display portion 12 displays the white line detected by the white line detection portion 5 (step S6).

If the coordinates are currently in the disallowed region 11, the determining portion 7 makes a determination not to allow the white line detection portion 5 to operate and the process proceeds on to step S7. If the white line detection portion 5 is already operating, operation of the white line detection portion 5 is stopped in step S7. If the white line detection portion 5 is not yet operating, the white line detection portion 5 is maintained in the inoperative state in step S7. Next, the display portion 12 indicates that the white line detection portion 5 is not being operated (i.e., is stopped) (step S8) and the process returns to step S1. The operation of the white line detection apparatus 1 is as described above.

The white line detection apparatus 1 according to the first example embodiment enables the white line detection portion 5 to function sufficiently in the range where the interference from thermal noise is acceptable.

Figure 5:
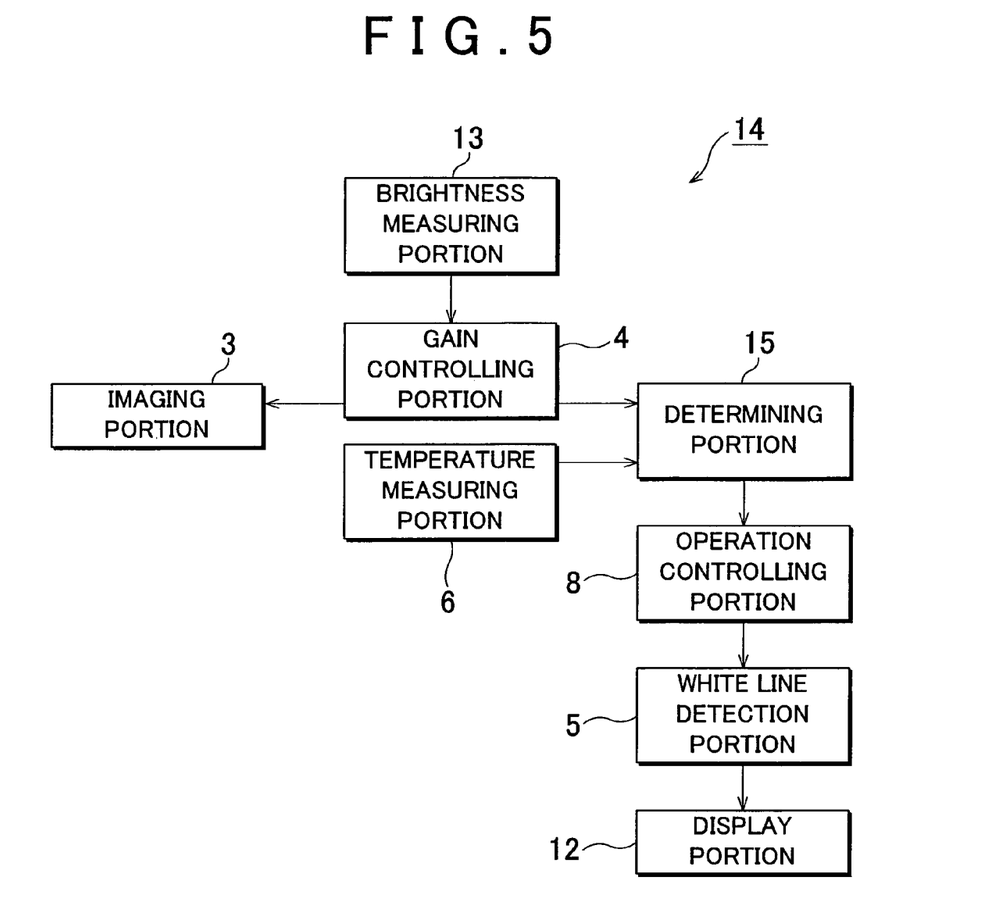
FIG. 5 is a block diagram of the structure of a white line detection apparatus according to a second example embodiment of the invention.
Figure 6:
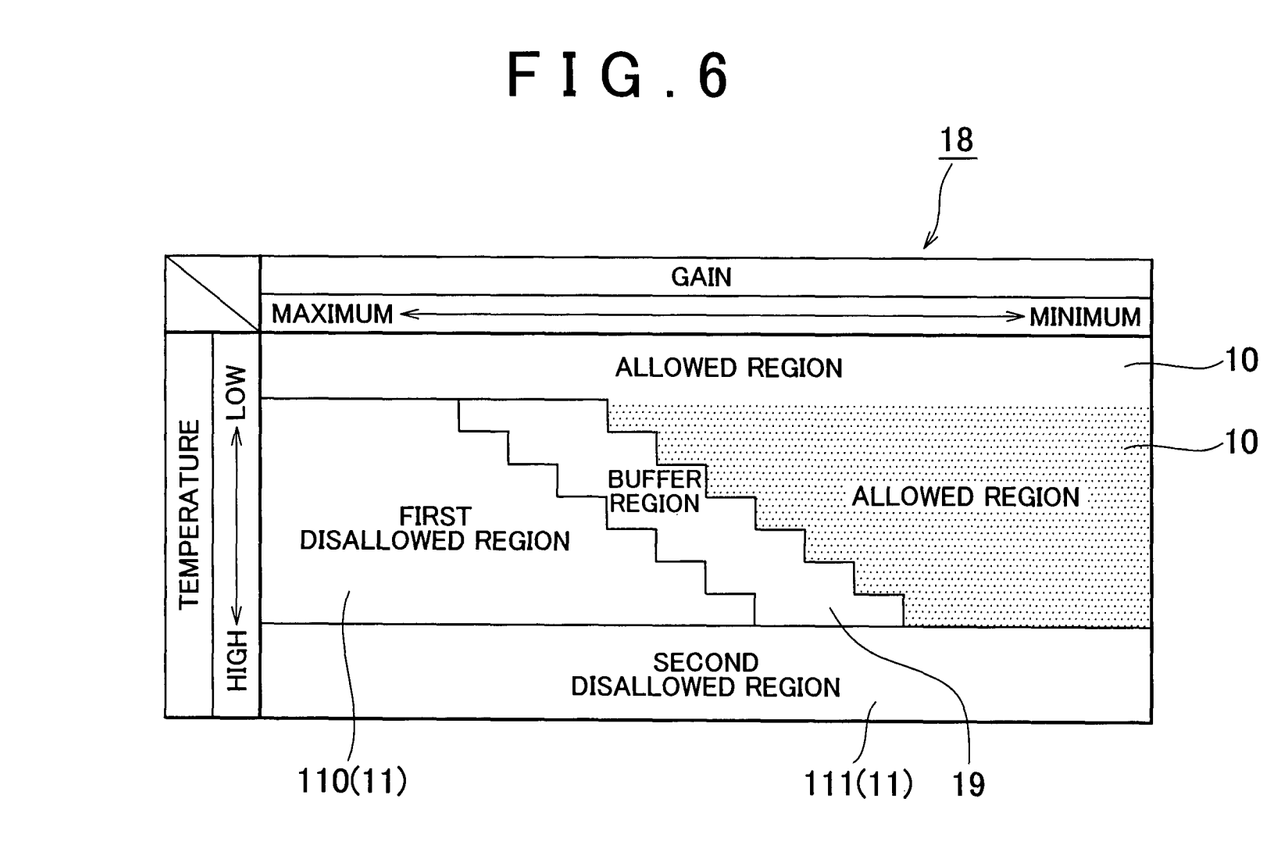
FIG. 6 is a view of an operation control map in the second example embodiment.
Figure 7A:
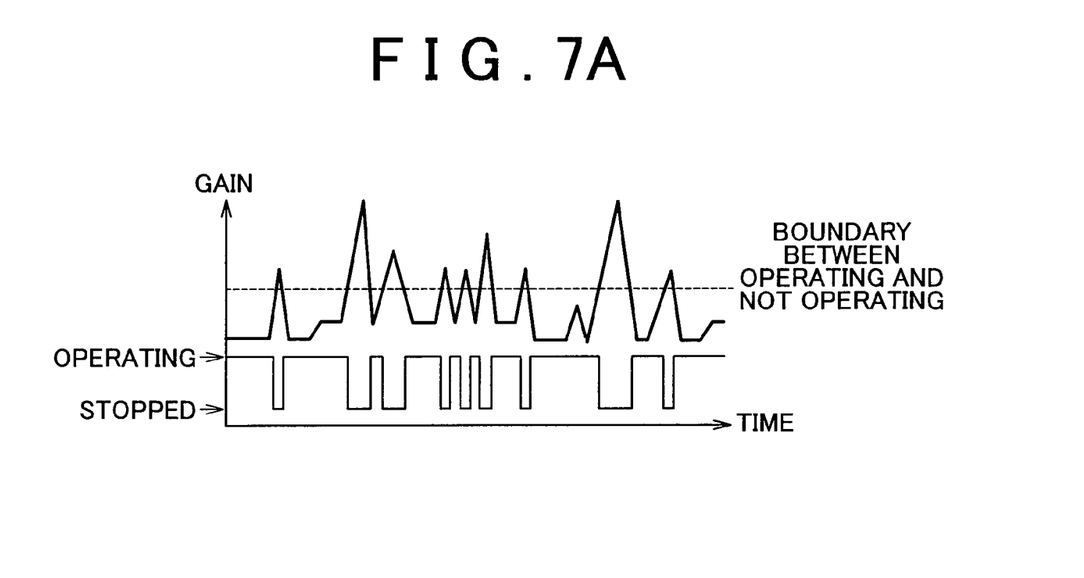
FIGS. 7A and 7B are charts showing a comparison of an operating state of the white line detection apparatus according to the first example embodiment and an operating state of the white line detection apparatus according to the second example embodiment.
Figure 7B:
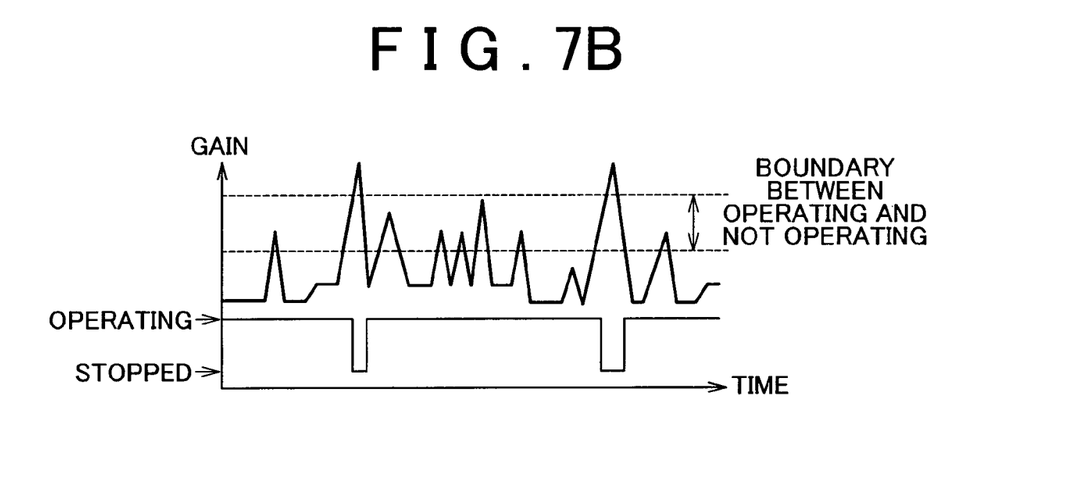

A white line detection apparatus according to a second example embodiment of the invention will now be described with reference to the drawings. FIG. 5 is a block diagram of a white line detection apparatus according to the second example embodiment. FIG. 6 is a view of an operation control map in the second example embodiment, and FIGS. 7A and 7B are charts showing a comparison of an operating state of the white line detection apparatus according to the first example embodiment and an operating state of the white line detection apparatus according to the second example embodiment. Incidentally, the components of the second example embodiment that are the same those in the first example embodiment will be denoted using the same reference characters and descriptions of such components will be omitted.

The white line detection apparatus 14 according to the second example embodiment includes an imaging portion 3, a gain controlling portion 4, a white line detection portion 5, a temperature measuring portion 6, a determining portion 15, an operation controlling portion 8, a brightness measuring portion 13, and a display portion 12.

The second example embodiment differs from the first example embodiment in terms of the structure of the determining portion 15. Otherwise, the second embodiment is the same as that of the first example embodiment.

The determining portion 15 differs from the determining portion 7 of the first example embodiment in that it has an operation control map 18 instead of the operation control map 9. The operation control map 18 has a buffer region 19 between the allowed region 10 and the disallowed region 11.

As shown in FIG. 6, the buffer region 19 in the operation control map 18 functions like the disallowed region 11 if the coordinates determined by the gain and the temperature enter the buffer region 19 from the first disallowed region 110 due to a change in the gain. That is, if the coordinates enter the buffer region 19 from the disallowed region 110, the determining portion 15 makes a determination not to allow operation of the white line detection portion 5. This means that hysteresis is generated between the first disallowed region 110 and the buffer region 19. Accordingly, the white line detection portion 5 will not operate even if the coordinates go back and forth between the first disallowed region 110 and the buffer region 19. As a result, the white line detection portion 5 is prevented from frequently starting and stopping repeatedly (see FIG. 7B). If the buffer region 19 is not provided, the white line detection portion 5 frequently starts and stops repeatedly, as shown in FIG. 7A, so the benefit of providing the buffer region 19 is evident.

Also, the buffer region 19 in the operation control map 18 functions like the allowed region 10 if the coordinates determined by the gain and the temperature enter the buffer region 19 from the allowed region 10 due to a change in the gain. That is, the determining portion 15 makes a determination to allow operation of the white line detection portion 5 when the coordinates enter the buffer region 19 from the allowed region 10. This means that hysteresis is generated between the allowed region 10 and the buffer region 19. Accordingly, the white line detection portion 5 will continue to operate even if the coordinates go back and forth between the allowed region 10 and the buffer region 19. As a result, the white line detection portion 5 is prevented from frequently starting and stopping repeatedly (see FIG. 7B). If the buffer region 19 is not provided, the white line detection portion 5 frequently starts and stops repeatedly, as shown in FIG. 7A, so the benefit of providing the buffer region 19 is evident.

The second example embodiment makes it possible to prevent a phenomenon from occurring in which the white line detection portion 5 frequently starts and stops repeatedly when the gain increases every time the vehicle passes through an area of darkness such as when the vehicle passes through an area that is continuously shaded by trees or the like where there is a drastic different between light and dark or keeps going into and coming out of funnels.

Figure 8:
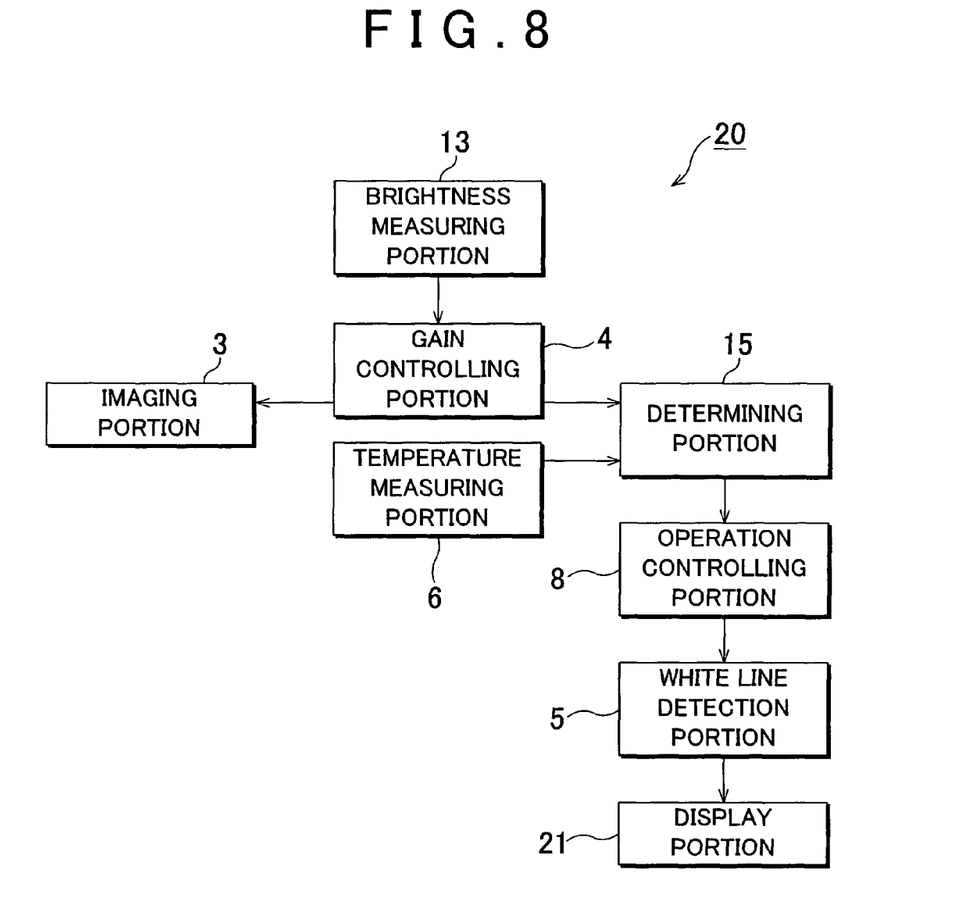
FIG. 8 is a block diagram of the structure of a white line detection apparatus according to a third example embodiment of the invention.
Figure 9A:
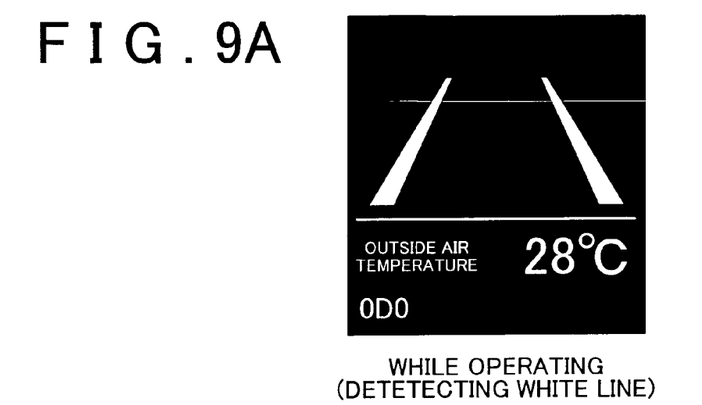
FIGS. 9A, 9B and 9C are views of screens on a display portion in the third example embodiment.
Figure 9B:
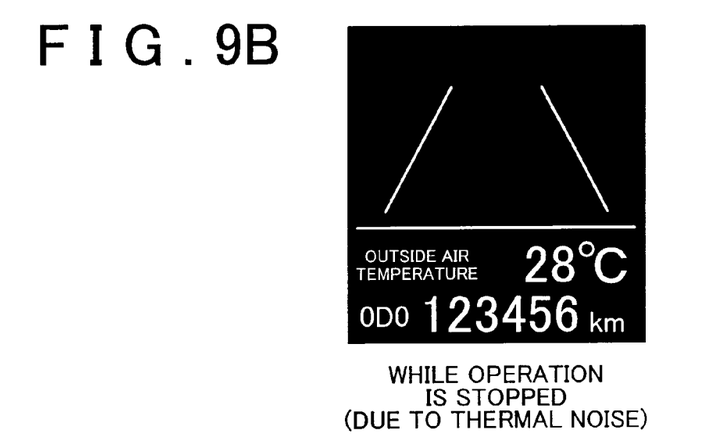

Next, a white line detection apparatus according to a third example embodiment of the invention will be described with reference to the drawings. FIG. 8 is a block diagram of the white line detection apparatus according to the third example embodiment. FIGS. 9A to 9B are views of screens on the display portion in the third example embodiment, and FIG. 10 is a flowchart illustrating the operation of the white line detection apparatus according to the third example embodiment. The components in this third example embodiment that are the same those in the second example embodiment will be denoted by the same reference characters and descriptions of those components will be omitted.

The white line detection apparatus 20 according to the third example embodiment includes an imaging portion 3, a gain controlling portion 4, a white line detection portion 5, a temperature measuring portion 6, a determining portion 15, an operation controlling portion 8, a brightness measuring portion 13, and a display portion 21.

The display portion 21 of the third example embodiment differs from that of the second example embodiment. All of the other components are the same as those of the second example embodiment.

The display portion 21 informs the user of the operating state of the white line detection portion 5. The display portion 21 indicates whether the white line detection portion 5 is in an operational state (i.e., in which the amplifier is operating), a non-recognizing state due to excessive thermal noise, or a non-recognizing state due to the temperature of the imaging portion 3 exceeding the operation guaranteed temperature, based on the determination results from the determining portion 15. That is, if the determination portion 15 determines that operation is allowed based on fact that the coordinates on the operation control map 9 which are determined by the gain and the temperature are in the allowed region 10 such that the white line detection portion 5 is in the recognizing state, the display portion 21 displays the white line detected by the white line detection portion 5. On the other hand, if the determination portion 15 determines that operation is not allowed based on the fact that the coordinates on the operation control map 9 which are determined by the gain and the temperature are in the first disallowed region 110 such that the white line detection portion 5 is in the non-recognizing state, the display portion 21 indicates that the white line detection portion 5 is in the non-recognizing state due to the excessive thermal noise. If the determination portion 15 determines that operation is not allowed based on the fact that the coordinates on the operation control map 9 which are determined by the gain and the temperature are in the second disallowed region 111 such that the white line detection portion 5 is in the non-recognizing state, the display portion 21 indicates that the white line detection portion 5 is in the non-recognizing state due to the temperature of the imaging portion 3 exceeding the operation guaranteed temperature.

FIG. 9A is a view of an example of a screen displayed by the display portion 21 when the white line detection portion 5 is in the operational state. In the example shown in FIG. 9A, two thick white lines detected by the white line detection portion 5 appear on the screen. In addition, the outside air temperature and the total distance travelled may also be displayed at the bottom of the screen. This screen indicates that the white line detection portion 5 is operating normally.

FIG. 9B is a view of an example of a screen displayed by the display portion 21 when the white line detection portion 5 is in the non-recognizing state due to the influence of excessive amplified thermal noise. In the example shown in FIG. 9B, two thin vertical white lines are shown. These white lines indicate that the white line detection portion 5 is unable to detect a white line due to excessive amplified thermal noise. In addition, the outside air temperature and the total distance travelled may be displayed at the bottom of the screen.

Figure 9C:
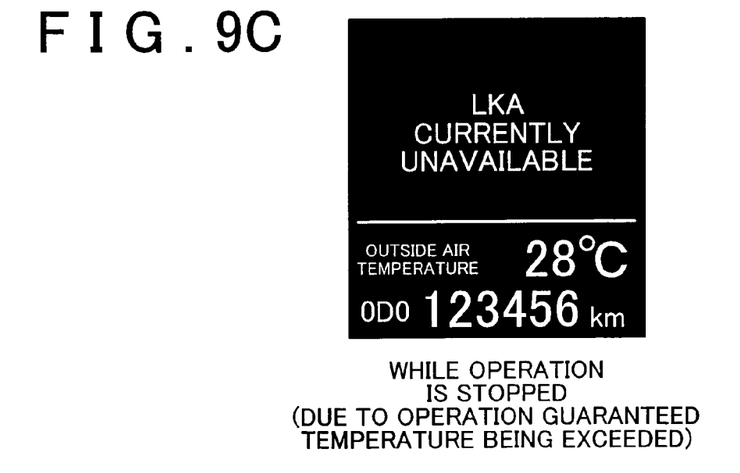
Figure 10:
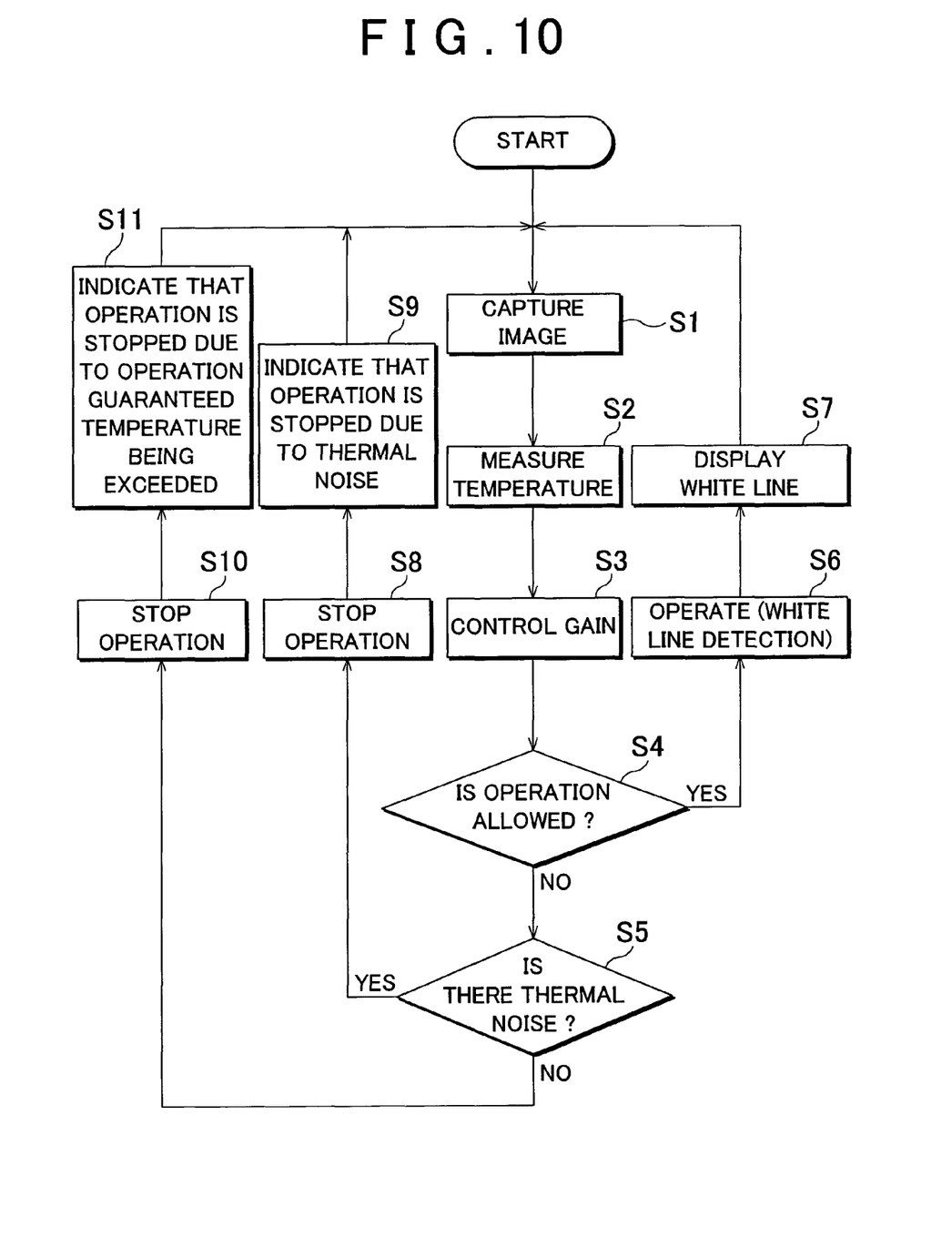
FIG. 10 is a flowchart illustrating operation of the white line detection apparatus according to the third example embodiment.

FIG. 9C is a view of an example of a screen displayed by the display portion 21 when the white line detection portion 5 is in the non-recognizing state as a result of the temperature of the imaging portion 3 exceeding the operation guaranteed temperature. In the example shown in FIG. 9C, the phrase "LKA CURRENTLY UNAVAILABLE" appears in the center of the screen. This phrase indicates that the white line detection portion 5 is unable to recognize a white line because the temperature of the imaging portion 3 exceeds the operation guaranteed temperature. In addition, the outside air temperature and the total distance travelled may be displayed at the bottom of the screen.

Next, the operation of the white line detection apparatus 20 according to the third example embodiment will be described with reference to FIG. 10, which is a flowchart illustrating an example of the operation of the white line detection apparatus 20. First, the imaging portion 3 captures an image of the road surface ahead of the vehicle (step S1). Next, the temperature measuring portion 6 measures the temperature of the imaging portion 3 (step S2). Then the gain controlling portion 4 controls the gain of the amplifying portion based on the brightness around the vehicle (step S3). Next, the determining portion 15 determines whether operation of the white line detection portion 5 is to be permitted based on whether the coordinates on the operation control map 9 which are determined by the gain and the temperature are in the allowed region 10, the first disallowed region 110, or the second disallowed region 111 (steps S4, S5).

If the coordinates are currently in the allowed portion 10, the determining portion 15 makes a determination to allow operation of the white line detection portion 5 and the process proceeds on to step S6. In step S6, the white line detection portion 5 detects the white line based on the captured image signal. Then the display portion 21 displays the white line detected by the white line detection portion 5 (step S7).

If the coordinates are currently in the first disallowed region 110, the determining portion 15 makes a determination to prohibit operation of the white line detection portion 5 due to excessive amplified thermal noise and the process proceeds on to step S8. If the white line detection portion 5 is already operating, operation of the white line detection portion 5 is stopped in step S8. If the white line detection portion 5 is not yet operating, the white line detection portion 5 is maintained in the inoperative state in step S8. Next, the display portion 21 indicates that the white line detection portion 5 is not operating (i.e., is stopped) (step S9) due to excessive amplified thermal noise.

If the coordinates are currently in the second disallowed region 111, the determining portion 15 makes a determination to prohibit operation of the white line detection portion 5 and the process proceeds on to step S10. If the white line detection portion 5 is already operating, operation of the white line detection portion 5 is stopped in step S10. If the white line detection portion 5 is not yet operating, the white line detection portion 5 is maintained in the inoperative state in step S10. Next, the display portion 21 indicates that the white line detection portion 5 is in the inoperative state (step S11) due to the temperature of the imaging portion 3 exceeding the operation guaranteed temperature. The operation of the white line detection apparatus 20 is as described above.

The white line detection apparatus 20 according to the third example embodiment enables the white line detection portion 5 to function sufficiently in the range where the influence from thermal noise is acceptable. Also, in the foregoing first example embodiment, the state in which the white line detection portion 5 has stopped operating due to thermal noise is indicated on the screen in the same manner that the state in which the white line detection portion 5 has stopped operating due to the temperature of the imaging portion 3 exceeding the operation guaranteed temperature (see FIG. 3B). As a result, the user may not know why the white line detection portion 5 has stopped operating and suspect that the white line detection apparatus 20 is faulty. In contrast, in the third example embodiment, when operation of the white line detection portion 5 stops due to thermal noise, it is treated just as non-recognizing state and is indicated by a screen different from the screen that appears when the white line detection portion 5 stops operating due to the temperature of the imaging portion 3 exceeding the operation guaranteed temperature. Accordingly, the user will not suspect that the white line detection apparatus 20 is faulty.

The invention is useful when applied to a vehicle detecting white line in an area where low and high temperatures are drastically different from one another and the brightness around the vehicle changes frequently.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

The invention claimed is:

1. An operation control map which, in a white line detection apparatus including a road surface imaging portion, includes a solid-state imaging sensor, a white line detection portion that detects white line on a road based on a captured image of the road surface, and a determining portion that determines whether to allow operation of the white line detection portion, is referenced as a determination reference for determining whether to allow operation of the white line detection portion, comprising:
   an allowed region, in which operation of the white line detection portion is allowed, that is set based on values of a gain of a road surface image signal generated by the road surface imaging portion and a detected temperature of the road surface imaging portion, which are variables in the operation control map;
   a first disallowed region, in which operation of the white line detection portion is not allowed, that is also set based on the values of the variables; and
   a second disallowed region, in which operation of the white line detection portion is not allowed, that is set for the temperature of the imaging portion exceeding a temperature at which operation of the imaging portion is guaranteed,
   wherein the allowed region is a region that is set when reduced accuracy of white line detection, due to the thermal noise generated in the solid-state imaging sensor, falls within an acceptable range, and the first disallowed region is a region that is set when the reduced accuracy of white line detection falls outside of the acceptable range.

2. The operation control map according to claim 1, further comprising:
   a buffer region interposed between the allowed region and the first disallowed region,
   wherein the buffer region functions like the first disallowed region if coordinates determined by the gain and the temperature enter the buffer region from the first disallowed region due to a change in the gain, and the buffer region functions like the allowed region if the coordinates enter the buffer region from the allowed region due to a change in the gain.

3. A white line detection apparatus that detects a white line on a road, comprising:
- a road surface imaging portion that includes a solid-state image sensor which captures an image of the road surface;
- a gain controlling portion that controls the gain when amplifying a road surface image signal generated by the road surface imaging portion, based on the brightness around a vehicle;
- a white line detection portion that compares the difference between brightness values of the road and a white line in the amplified road surface image signal with a threshold value, and detects the white line based on the comparison results;
- a temperature measuring portion that measures the temperature of the road surface imaging portion;
- a determining portion that determines whether to allow operation of the white line detection portion based on the gain controlled by the gain controlling portion and the temperature measured by the temperature measuring portion; and
- an operation controlling portion that controls the operation of the white line detection portion based on the determination results of the determining portion,
- wherein the determining portion includes an operation control map in which the gain and the temperature are variables and which has an allowed region, in which operation of the white line detection portion is allowed, and a first disallowed region, in which operation of the white line detection portion is not allowed, that are set based on the values of the variables, and a second disallowed region, in which operation of the white line detection portion is not allowed, that is set for the temperature of the imaging portion exceeding a temperature at which operation of the imaging portion is guaranteed,
- and the determining portion determines whether to allow the operation based on the operation control map, and
- wherein the allowed region is a region that is set when reduced accuracy of white line detection, due to the thermal noise generated in the solid-state imaging sensor, falls within an acceptable range, and the first disallowed region is a region that is set when the reduced accuracy of white line detection falls outside of the acceptable range.

4. The white line detection apparatus according to claim 3, wherein a buffer region is interposed between the allowed region and the first disallowed region, and the buffer region functions like the first disallowed region if coordinates determined by the gain and the temperature enter the buffer region from the first disallowed region due to a change in the gain, and the buffer region functions like the allowed region if the coordinates enter the buffer region from the allowed region due to a change in the gain.

5. The white line detection apparatus according to claim 3, further comprising:
- a display portion that informs a user of the operating state of the white line detection portion,
- wherein the display portion indicates that the white line detection portion is i) operating or ii) not operating.

6. The white line detection apparatus according to claim 4, further comprising:
- a display portion that informs a user of the operating state of the white line detection portion,
- wherein the operation control map further includes a region where the temperature exceeds an operation guaranteed temperature of the white line detection apparatus as an operation disallowed region, and the display portion indicates that the white line detection portion is i) operating, ii) not operating due to thermal noise, or iii) not operating due to the operation guaranteed temperature being exceeded.

7. A display unit configured to be cooperative with a white line detection apparatus, and which informs a user of the operating state of the white line detection portion,
- said white line detection apparatus including a road surface imaging portion, a white line detection portion that detects white line on a road based on a captured image of the road surface, a determining portion that determines whether to allow operation of the white line detection portion based on an operation control map in which the temperature of the road surface imaging portion and the gain when amplifying a road surface image signal generated by the road surface imaging portion are variables, and an operation controlling portion that controls the operation of the white line detection portion based on the determination results of the determining portion, and
- said operation control map comprising an allowed region, in which operation of the white line detection portion is allowed, and a first disallowed region, in which operation of the white line detection portion is not allowed, that are set based on the values of variables, and a second disallowed region, in which operation of the white line detection portion is not allowed, that is set for the temperature of the imaging portion exceeding a temperature at which operation of the imaging portion is guaranteed, wherein the allowed region is a region that is set when reduced accuracy of white line detection, due to the thermal noise generated in the solid-state imaging sensor, falls within an acceptable range, and the first disallowed region is a region that is set when the reduced accuracy of white line detection falls outside of the acceptable range,
- the display unit indicating that the white line detection portion is i) operating when coordinates of the variables fall within the allowed region of the operation control map, ii) being controlled not to operate due to thermal noise generated in the road surface imaging portion when coordinates of the variables fall within the first disallowed region of the operation control map, or iii) being controlled not to operate due to an operation guaranteed temperature of the white line detection apparatus being exceeded when coordinates of the variables fall within the second disallowed region of the operation control map.

8. The display unit according to claim 7, wherein, in a case the white line detection portion is operating, the display unit displays a white line detected by the white line detection portion using a white line thicker than in case the white line detection portion is being controlled not to operate due to thermal noise generated in the road surface imaging portion.

9. The display unit according to claim 7, wherein if the white line detection portion is being controlled not to operate due to the operation guaranteed temperature of the white line detection apparatus being exceeded, the display unit indicates that a lane keeping assist system is currently unavailable.

10. The display unit according to claim 8, wherein if the white line detection portion is being controlled not to operate due to the operation guaranteed temperature of the white line detection apparatus being exceeded, the display unit indicates that a lane keeping assist system is currently unavailable.

* * * * *